United States Patent
Schlichter et al.

(10) Patent No.: US 9,480,942 B2
(45) Date of Patent: Nov. 1, 2016

(54) SEPARATION DEVICE FOR SEPARATING IMPURITIES FROM GASES

(71) Applicant: Hydac Process Technology GmbH, Neunkirchen (DE)

(72) Inventors: Bernhard Schlichter, Saarbrücken (DE); Sergej Zeller, Katzweiler (DE); Manfred Deutschmeyer, Perl (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 0 days.

(21) Appl. No.: 14/422,814

(22) PCT Filed: Aug. 14, 2013

(86) PCT No.: PCT/EP2013/002442
§ 371 (c)(1),
(2) Date: Feb. 20, 2015

(87) PCT Pub. No.: WO2014/032774
PCT Pub. Date: Mar. 6, 2014

(65) Prior Publication Data
US 2015/0343363 A1    Dec. 3, 2015

(30) Foreign Application Priority Data
Aug. 29, 2012   (DE) .................. 10 2012 017 101

(51) Int. Cl.
| | | |
|---|---|---|
| *B01D 53/02* | (2006.01) | |
| *B01D 46/52* | (2006.01) | |
| *B01D 46/00* | (2006.01) | |
| *B01D 46/24* | (2006.01) | |

(52) U.S. Cl.
CPC ............ *B01D 46/521* (2013.01); *B01D 46/003* (2013.01); *B01D 46/2411* (2013.01); *B01D 2265/06* (2013.01)

(58) Field of Classification Search
CPC ............ B01D 2265/06; B01D 46/003; B01D 46/2411; B01D 46/521
See application file for complete search history.

(56) References Cited

U.S. PATENT DOCUMENTS

| | | | |
|---|---|---|---|
| 3,347,026 A * | 10/1967 | Zankey | B01D 46/002 210/316 |
| 3,364,658 A | 1/1968 | Walker | |
| 3,771,295 A | 11/1973 | Wheeler, Jr. | |
| 4,087,264 A | 5/1978 | Holm | |
| 4,600,416 A | 7/1986 | Mann | |
| 4,692,175 A * | 9/1987 | Frantz | B01D 29/23 55/319 |
| 4,848,989 A | 7/1989 | Maeda | |
| 6,302,932 B1 * | 10/2001 | Unger | B01D 19/0031 210/315 |
| 2003/0010205 A1 * | 1/2003 | Bikson | B01D 46/003 95/52 |

(Continued)

FOREIGN PATENT DOCUMENTS

| | | |
|---|---|---|
| DE | 297 00 579 U1 | 3/1997 |
| DE | 10 2005 062 245 A1 | 6/2007 |

(Continued)

*Primary Examiner* — Christopher P Jones
(74) *Attorney, Agent, or Firm* — Wenderoth, Lind & Ponack, L.L.P.

(57) ABSTRACT

A device for separating impurities from gases, such as process gases or hydrogen, includes a filter unit (25) for separating particulates and fluid media, such as water and/or oil. The filter unit has a coalescing unit (29) for increasing the drop volume of separated fluid media and a collection unit, preferably in the form of an absorber unit (15) for binding the separated fluid media.

13 Claims, 1 Drawing Sheet

(56) References Cited

U.S. PATENT DOCUMENTS

2007/0175191 A1    8/2007   Ziebold et al.
2011/0056381 A1    3/2011   Azwell et al.
2011/0265655 A1*  11/2011   Schuster ............ B01D 46/0023
                                                              96/134

FOREIGN PATENT DOCUMENTS

| DE | 10 2011 009 232 A1 | 7/2012 |
| EP | 0 337 248 A1 | 10/1989 |
| JP | 10-128037 A | 5/1998 |

* cited by examiner

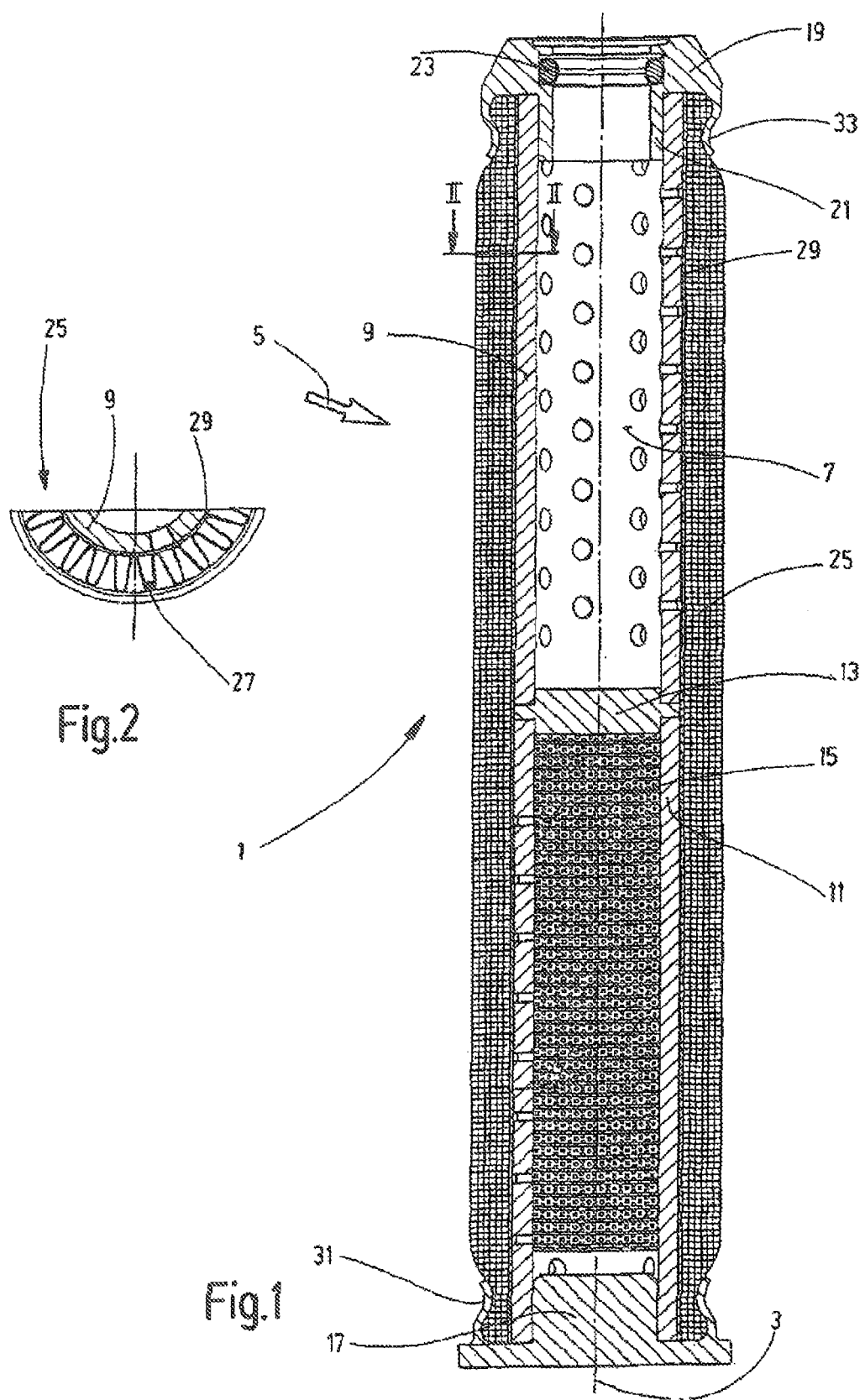

SEPARATION DEVICE FOR SEPARATING IMPURITIES FROM GASES

FIELD OF THE INVENTION

The invention relates to a separation device for separating impurities from gases, such as process gases or hydrogen.

BACKGROUND OF THE INVENTION

When gases are used as an operating resource, as reagents or the like in technical processes, impurities in the form of particulate and/or fluid media in the process gases in question pose a risk to operational reliability up to and including system failure, may distort analysis results or may result in other malfunctions. In many cases, in addition to particulate impurities, the available gases are also contaminated by fluid media such as water and oil. Among other things, in the case of the increased use of hydrogen ($H_2$) for actuation purposes, such contamination of the gases that serve as operating resources is necessary to anticipate. Freedom from particulate and fluid impurities, such as water and oil, is essential to the operating ability of the relevant, associated systems such as, in particular, fuel cells.

SUMMARY OF THE INVENTION

An object of the invention is to provide an improved separation device that allows the separation of such impurities out of process gases, in particular out of hydrogen that is provided for technical purposes.

This object is basically achieved according to the invention by a separation device, where the separation device has a filter device for separating out particulate and fluid media such as water and/or oil, a coalescing device to increase the size of the droplets of fluid media that have been separated off, as well as a collecting device, which collecting device is preferably designed in the form of a absorption device that binds the fluid media that have been separated off.

According to an advantageous embodiment of the invention, the separation device has at least one separating element, which defines a primary axis, and which can be accommodated in a housing such that the primary axis is oriented at least approximately vertically. The absorption device is disposed in a region of the separating element that allows the transfer of fluid media from the coalescing device to the absorption device through the effect of gravity. A device is thereby created that has a simple design and that allows an independent operation without additional components because the conveyance of fluid media that have been separated off to the absorption device is self-actuating, caused by the effect of gravity.

In the case of especially advantageous embodiments, the respective separating element is designed in the manner of a filter cartridge having a support tube. The has media channels and coaxially encompasses the primary axis. The outside of the support tube is enclosed by coalescing device and filter device. That separating element can be implemented in a compact unit, which unit can be replaced in an easy manner at the end of each respective intended operating interval.

In an especially advantageous manner, the internal space of the support tube is subdivided into an upper discharge chamber, from which the cleaned gas can be discharged after it has passed through the filter device and the coalescing device, and into a lower absorber chamber that forms the absorption device.

For such a separation process, in which the gas that is to be cleaned flows through the separating element from the outside into the inner discharge chamber, in advantageous embodiments, the support tube is enclosed from the outside to the inside by pleated filter material of the filter device and by a part of the drainage layer that forms the coalescing device. In the coalescing device, pre-coagulated filter media that have been separated off by the filter device sink down to the region of the absorber chamber as the droplet size steadily increases.

A preferably multi-layered filter mat, made out of fiberous material, for example in the form of a metal fiber nonwoven and causing a pre-coagulation of fluid media, is preferably provided as a filter material.

That filter mat that is made of that fiberous material can also form a mesh packet.

A metallic mesh or a layer of fiberous material that has been applied according to the spun-spray method may be advantageously provided as a drainage layer.

In especially advantageous embodiments, the absorption device contains a mixture of hydrophilic substances and oleophilic substances in the absorber chamber.

Such mixture of substances may contain substances, such as silica gel or zeolite beads as hydrophilic components, and substances, such as diatomaceous earth or melt-blown fiberous material as oleophilic components, in the filling of the absorber chamber.

In the case of especially advantageous embodiments, the support tube comprises coaxial tube members, which tube members are connected to one another at a connecting piece that separates the discharge chamber from the absorber chamber. Such embodiments are characterized by particular compactness, because the absorber chamber in the lower section of the composite support tube is integrated into the filter cartridge.

In the case of such a design having an assembled support tube, the configuration may be advantageously such that a fluid-restraining barrier is provided on the outside of the tube member associated with the discharge chamber, which barrier is formed by a hydrophobic and/or oleophobic fabric, for example. Such barrier may also be formed of any structure having a degree of fineness that allows the passage of gas, but that prevents the passage of drops.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a side view in section of a separating element of a separation device according to an exemplary embodiment of the invention; and FIG. 2 is a partial end view in section of the separating element taken along the line II-II of FIG. 1.

DETAILED DESCRIPTION OF THE INVENTION

The separating element 1 depicted in FIG. 1 can be accommodated in a housing, not shown here, as a component of the separation device according to the invention. For the operation of the separation device, the separating element 1 is disposed in the associated housing such that the primary or longitudinal axis 3 formed by the separating element 1 is oriented at least approximately vertically. When using the separation device in a fueling system having a hydrogen operated drive device, the housing that is to accommodate the separating element 1 is designed for a very high pressure level of 750 to 1000 bar, for example. That housing design is conventional for such applications, and is configured such that the hydrogen ($H_2$) that is to be cleaned flows against the separating element 1 from outside during operation, as is indicated by a flow arrow 5. The clean gas exits from an discharge chamber 7, which is located inside the separating element 1, and moves upward and out.

The separating element 1 is designed in the manner of a filter cartridge, having a support tube that comprises two tube members 9 and 11. Tube members 9, 11 are disposed coaxially aligned with the primary axis 3 and with one another, and are connected to one another by a connecting piece 13. Both tube members 9, 11 that form the support tube have media passages in the manner conventional for support tubes, which media passages are not numbered in the drawing. The connecting piece 13 separates the hollow space enclosed by the support tube 9, 11 into the upper discharge chamber 7, located in the upper tube member 9, and a lower absorber chamber 15, enclosed by the lower tube member 11. The absorber chamber 15 is closed at the lower end of the tube member 11 by an end piece 17 in the form of a stopper. A connector 19 is provided at the upper end of the separating element 1 for the discharge of clean gases from the discharge chamber 7. The connector 19 extends with a connecting piece 21 into the upper end of the tube member 9. A seal in the form of an O-ring 23 for connecting a line (not shown) is located on connecting piece 23.

A filter device in the form of a cylindrical filter structure 25 of a virtual outer circumference is located on the outside of the separating element 1. In this case, this filter structure 25 is a water trapping material, which, as shown in FIG. 2, is pleated and preferably has a multi-layered design. A filter structure 25 in the form of a metal fiber nonwoven, which causes a pre-coagulation of fluid media, may preferably be provided as a filter material. A mesh packet can be formed that is closed along a longitudinal seam 27. A drainage layer 29 is connected to the inside of the filter structure 25 as a coalescing device. In this case, the present embodiment is a structure that functions as a coalescer, in which droplets of water and/or oil, which are formed at the filter structure 25 by pre-coagulation, are coagulated into larger drop volumes so that these media drop down by gravity as the droplet size steadily increases.

Instead of the pleated filter medium, a preferably multi-layered filter mat may serve as a filter structure, which may be pleated or designed as a cylindrical rolling element. The drainage layer 29 may be a metallic mesh or a layer of fiberous material, which is applied directly to the inside of the pleated filter medium 25, for example using the spun-spray method. As soon as the droplets that are formed have sunk down into the region of the lower tube member 11 of the support tube, in which the absorber chamber 15 is located, the accumulation of formed droplets reaches the absorber chamber 15 via the fluid passages of the tube member 11. A mixture of substances comprising hydrophilic substances as well as oleophilic substances is located in the absorber chamber 15 to bind the fluids. In so doing, a mixture of silica gel or zeolite beads may advantageously be provided as hydrophilic components, and substances such as diatomaceous earth or melt-blown fiberous material as oleophilic components.

A fluid-retaining barrier may be provided within the drainage layer 29 along the tube member 9 associated with the discharge chamber 7, for example being formed by a hydrophobic and/or oleophobic fabric. The assembly thus formed is held together at what, in the drawing, is the lower end by the end piece 17, and at the upper end by the connector 19. There are edge members 31 or, respectively, 33 located on both of these parts 17 and 19, which project axially and overlap the facing edge of the filter mat 25. As shown in FIG. 1, these wall parts 31, 33 can be pressed inward through the application of compressive force that is applied radially inward, in order to fix the end piece 17 and connector 19 to the narrowing formed on the filter mat 25.

While one embodiment has been chosen to illustrate the invention, it will be understood by those skilled in the art that various changes and modifications can be made therein without departing from the scope of the invention as defined in the claims.

The invention claimed is:

1. A separation device for separating impurities from gases, comprising:
    a filter cartridge configured to and capable of separating out particulate and fluid media from gases, said filter cartridge having a longitudinal axis and a filter medium;
    a support tube being in said filter cartridge having media channels therein and coaxially encompassing said longitudinal axis, said support tube including coaxial first and second tube members connected with one another at a connecting piece separating a discharge chamber inside said first tube member from an absorber chamber inside said second tube member, said connecting piece including an annular disc extending between and connecting adjacent axial ends of said first and second tube members;
    a collecting device including an absorber in said absorber chamber configured to and capable of binding fluid media separated from gases; and
    a coalescing device configured to and capable of increasing sizes of drops of fluid media separated from gases, said coalescing device enclosing an outer surface of said support tube with said filter medium.

2. A separation device according to claim 1 wherein said filter cartridge is accommodatable in a housing with said longitudinal axis oriented at least approximately vertically, with said absorber disposed to receive transfer of fluid media from said coalescing device through an effect of gravity.

3. A separation device according to claim 2 wherein said discharge chamber configured to and capable of discharging clean gas is positioned above said absorber chamber.

4. A separation device according to claim 1 wherein said filter medium comprises pleated filter material configured to and capable of having a gas to be cleaned flow therethrough from an outside thereof to an inside thereof; and
    said coalescing device comprises a drainage layer on an inner surface of said filter medium configured to and capable of conveying drops of fluid media to a region of said collecting device.

5. A separation device according to claim 1 wherein said filter medium comprises a multi-layered filter structure of a metal fiber fleece configured to and capable of causing a pre-coagulation of fluid media.

6. A separating device according to claim 5 wherein said filter structure comprises a mesh packet.

7. A separating device according to claim 4 wherein said drainage layer comprises a metallic mesh.

8. A separating device according to claim 4 wherein said drainage layer comprises a spun-sprayed fiberous material layer.

9. A separating device according to claim 1 wherein said absorber comprises a mixture of hydrophilic and oleophilic substances.

10. A separating device according to claim 9 wherein said hydrophilic substances comprise at least one of silica gel or zeolite beads; and
said oleophilic substances comprise at least one of diatomaceous earth or melt-blown fiberous material.

11. A separating device according to claim 1 wherein a fluid-restraining barrier is on an outside of said first tube member.

12. A separating device according to claim 11 wherein said fluid-restraining barrier comprises at least one of hydrophobic fabric or oleophobic fabric.

13. A separating device according to claim 1 wherein each of said first and second tube members have said media channels therein.

* * * * *